(12) United States Patent
Thomas et al.

(10) Patent No.: US 10,498,410 B2
(45) Date of Patent: Dec. 3, 2019

(54) METHODS AND APPARATUSES FOR TRANSMIT WEIGHTS

(71) Applicant: NOKIA SOLUTIONS AND NETWORKS OY, Espoo (FI)

(72) Inventors: Timothy Thomas, Au Train, MI (US); Frederick Vook, Schaumburg, IL (US); Eugene Visotsky, Buffalo Grove, IL (US); Tzu-Chung Hsieh, Hoffman Estates, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 82 days.

(21) Appl. No.: 15/414,922

(22) Filed: Jan. 25, 2017

(65) Prior Publication Data

US 2018/0212652 A1    Jul. 26, 2018

(51) Int. Cl.
*H04B 7/0452* (2017.01)
*H04B 7/08* (2006.01)
*H04B 7/06* (2006.01)

(52) U.S. Cl.
CPC ......... *H04B 7/0452* (2013.01); *H04B 7/0617* (2013.01); *H04B 7/0857* (2013.01)

(58) Field of Classification Search
CPC ... H04B 7/0452; H04B 7/0857; H04B 7/0617
See application file for complete search history.

(56) References Cited

U.S. PATENT DOCUMENTS

| | | | | |
|---|---|---|---|---|
| 2009/0280856 | A1* | 11/2009 | Ohwatari | H04B 7/0417 455/522 |
| 2010/0111223 | A1* | 5/2010 | Thomas | H04B 7/0634 375/296 |
| 2013/0223245 | A1* | 8/2013 | Taoka | H04L 25/03343 370/252 |

OTHER PUBLICATIONS

Jiang Jing et al. Energy efficiency based downlink multi user hybrid beamforming for millimeter wave massive MIMO system Journal of China universities of posts and telecommunications Mar. 2016 (Year: 2016).*

Christian B. Peel et al; A Vector-Perturbation Technique for Near-Capacity Multiantenna Multiuser Communication—Part I: Channel Inversion and Regularization; IEEE Transactions on Communications, vol. 53, No. 1, Jan. 2005; pp. 195-202.

(Continued)

*Primary Examiner* — Rina C Pancholi
(74) *Attorney, Agent, or Firm* — Squire Patton Boggs (US) LLP (57) ABSTRACT

Systems, methods, apparatuses, and computer program products for determining transmit weights are provided. One method includes selecting users to pair for multi-user multiple input multiple output transmission, calculating multi-user multiple input multiple output (MU-MIMO) transmit weights in a communication system employing an analog electrically steered array with Q antennas, applying the multi-user multiple input multiple output weights to the transmitted signals, and transmitting the weighted signals from an antenna array. The calculating may include calculating the MU-MIMO transmit weights so that a sum of power across a same element of the selected users' weight vectors is equal on all of the antennas and one of either sum throughput across users or sum signal to interference plus noise ratio (SINR) across users is maximized.

19 Claims, 4 Drawing Sheets

(56) References Cited

OTHER PUBLICATIONS

Charles A. Baird, et al; Adaptive Sidelobe Nulling Using Digitally Controlled Phase-Shifters; IEEE Transactions on Antennas and Propagation, vol. 24, No. 5, Sep. 1976.
David J. Love et al; Equal Gain Transmission in Multiple-Input Multiple-Output Wireless Systems; IEEE Transactions on Communications, vol. 51, No. 7, Jul. 2003; pp. 1102-1110.
Viveck R. Cadambe et al; Interference Alignment and Degrees of Freedom of the K-User Interference Channel; IEEE Transactions on Information Theory, vol. 54, No. 8, Aug. 2008; pp. 3425-3441.
An Liu et al; Phase Only RF Precoding for Massive MIMO Systems With Limited RF Chains; IEEE Transactions on Signal Processing, vol. 62, No. 17, Sep. 1, 2014; pp. 4505-4515.
Martin Schubert et al; Solution of the Multiuser Downlink Beamforming Problem With Individual SINR Constraints; IEEE Transactions on Vehicular Technology, vol. 53, No. 1, Jan. 2004; pp. 18-28.
Omar El Ayach et al; Spatially Sparse Precoding in Millimeter Wave MIMO Systems; IEEE Transactions on Wireless Communications, vol. 13, No. 3, Mar. 2014; pp. 1499-1513.
M. Mouhamadou et al; Smart Antenna Array Patterns Synthesis: Null Steering and Multi-User Beamforming by Phase Control; Progress in Electromagnetics Research, Pier 60, 90-106, 2006.
Weiheng Ni; Practical System Implementation for 5G Wireless Communication Systems; Master of Applied Science in the Department of Electrical and Computer Engineering, 2013.
Jing Jiang et al Energy-efficiency based downlink multi-user hybrid beamforming for millimeter wave massive MIMO system; 2016; Journal of China Universities of Posts and Telecommunications, vol. 23, No. 4, Aug. 1, 2016 (Aug. 1, 2016), pp. 53-62, XP029732010, ISSN: 1005-8885, D0I: 10.1016/S1005-8885(16)60045-6 the whole document.
Zi Ran et al Energy Efficiency Optimization of 5G Radio Frequency Chain Systems; 2016; IEEE Journal on Selected Areas in Communications vol. 34, No. 4, Apr. 1, 2016 (Apr. 1, 2016), pp. 758-771, XP011609690, ISSN: 0733-8716, D0I: 10.1109/JSAC.2016.2544579 [retrieved on May 10, 2016] p. 1-p. 10 section 1-section IV.
International Search Report and Written Opinion application No. PCT/EP2018/051313 dated May 4, 2018.

* cited by examiner

METHODS AND APPARATUSES FOR TRANSMIT WEIGHTS

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to transmit weights for multi-user multiple-input/multiple-output (MU-MIMO), for example, in 5G or NR systems.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation wireless systems (5G) refers to the next generation (NG) of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life.

SUMMARY

One embodiment is directed to a method, which may include selecting users to pair for multi-user multiple input multiple output transmission, and calculating multi-user multiple input multiple output transmit weights in a communication system employing an analog electrically steered array with Q antennas. The multi-user multiple input multiple output transmit weights may be applied to transmitted signals. The method may further include applying the multi-user multiple input multiple output weights to the transmitted signals, and causing a transmission of the weighted signals from an antenna array. The calculating may include calculating the multi-user multiple input multiple output transmit weights so that a sum of power across a same element of the selected user's weight vectors is equal on all of the Q antennas and one of either sum throughput across users or sum signal to interference plus noise ratio (SINR) across users is maximized.

Another embodiment is directed to an apparatus, which may include at least one processor and at least one memory including computer program code. The at least one memory and the computer program code may be configured, with the at least one processor, to cause the apparatus at least to select users to pair for multi-user multiple input multiple output transmission, and to calculate multi-user multiple input multiple output transmit weights in a communication system employing an analog electrically steered array with Q antennas. The multi-user multiple input multiple output transmit weights may be applied to transmitted signals. The at least one memory and the computer program code may be further configured, with the at least one processor, to cause the apparatus at least to apply the multi-user multiple input multiple output weights to the transmitted signals, and transmit the weighted signals from an antenna array. The apparatus may be configured to calculate the multi-user multiple input multiple output transmit weights so that a sum of power across a same element of the selected user's weight vectors is equal on all of the Q antennas and one of either sum throughput across users or sum signal to interference plus noise ratio across users is maximized.

Another embodiment is directed to an apparatus, which may include selecting means for selecting users to pair for multi-user multiple input multiple output transmission, and calculating means for calculating multi-user multiple input multiple output transmit weights in a communication system employing an analog electrically steered array with Q antennas. The multi-user multiple input multiple output transmit weights may be applied to transmitted signals. The apparatus may further include applying means for applying the multi-user multiple input multiple output weights to the transmitted signals, and transmitting means for causing a transmission of the weighted signals from an antenna array. The calculating means may include means for calculating the multi-user multiple input multiple output transmit weights so that a sum of power across a same element of the selected user's weight vectors is equal on all of the Q antennas and one of either sum throughput across users or sum signal to interference plus noise ratio (SINR) across users is maximized.

Another embodiment is directed to a computer program embodied on a non-transitory computer readable medium. The computer program, when executed by a processor, may be configured to control the processor to perform a process, which may include selecting users to pair for multi-user multiple input multiple output transmission, and calculating multi-user multiple input multiple output transmit weights in a communication system employing an analog electrically steered array with Q antennas. The multi-user multiple input multiple output transmit weights may be applied to transmitted signals. The process may further include applying the multi-user multiple input multiple output weights to the transmitted signals, and causing a transmission of the weighted signals from an antenna array. The calculating may include calculating the multi-user multiple input multiple output transmit weights so that a sum of power across a same element of the selected user's weight vectors is equal on all of the Q antennas and one of either sum throughput across users or sum signal to interference plus noise ratio (SINR) across users is maximized.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for equal gain multi-user multiple-input multiple-output (MU-MIMO) transmit weights, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

There are several factors which will make 5G systems, particularly above 40 GHz, unique. These factors are predominately the result of the higher bandwidth (BW) and also increased severity of hardware impairments seen as the frequency goes beyond 40 GHz. In particular, analog to digital converters (ADCs) and digital to analog converters (DACs) will consume significantly more power at the higher BWs making fully digital array solutions infeasible at least in the near term until hardware efficiency is substantially improved. The increased power consumption of the ADCs and DACs, along with the need for larger antenna arrays to overcome the higher path loss of these frequencies, drives the use of analog electrically steered arrays (AESAs) which are also sometimes referred to as radio-frequency (RF) arrays. These arrays require only one baseband unit per AESA and hence the number of ADCs and DACs would be minimized. Also, these arrays will be designed with a power-amplifier (PA) behind each element meaning that it is best to drive all elements with equal and maximal power since, otherwise, transmit power would be lost.

It is expected that 5G systems above 40 GHz will employ at least two AESAs with orthogonal polarizations at both the access point (AP) and user equipment (UE), where the polarizations are used to obtain dual stream transmission even in line-of-sight (LOS) channels. Thus, any MU-MIMO weights need to enable multi-stream transmission as well as employ equal-gain weights (meaning only phase is controlled on each antenna and maximal power is transmitted from each antenna after taking into account any back off needed because of the transmit waveform).

Typically, MU-MIMO weights control both the gain and phase on each antenna. However, since it may be best to drive the AESA with maximal power on each element, equal-gain versions of MU-MIMO weights are needed. One solution is to just take the equal-gain version of non-equal-gain MU-MIMO weights like regularized zero forcing (ZF), but it is possible that the resulting weights may be suboptimal. Hence, it may be desirable to have MU-MIMO weights for the AESA (RF array) which are characterized as being wideband (e.g., having non-frequency selective weights) and also being equal gain (phase only).

Certain embodiments of the present disclosure are directed to computing equal-gain (i.e., phase-only weights) MU-MIMO weights for an AESA array where the weights either maximize the sum signal to interference plus noise ratio (SINR) or the sum throughput. In an example embodiment, the target array type may correspond or be similar to the hybrid array 100 illustrated in FIG. 1.

Figure 1:
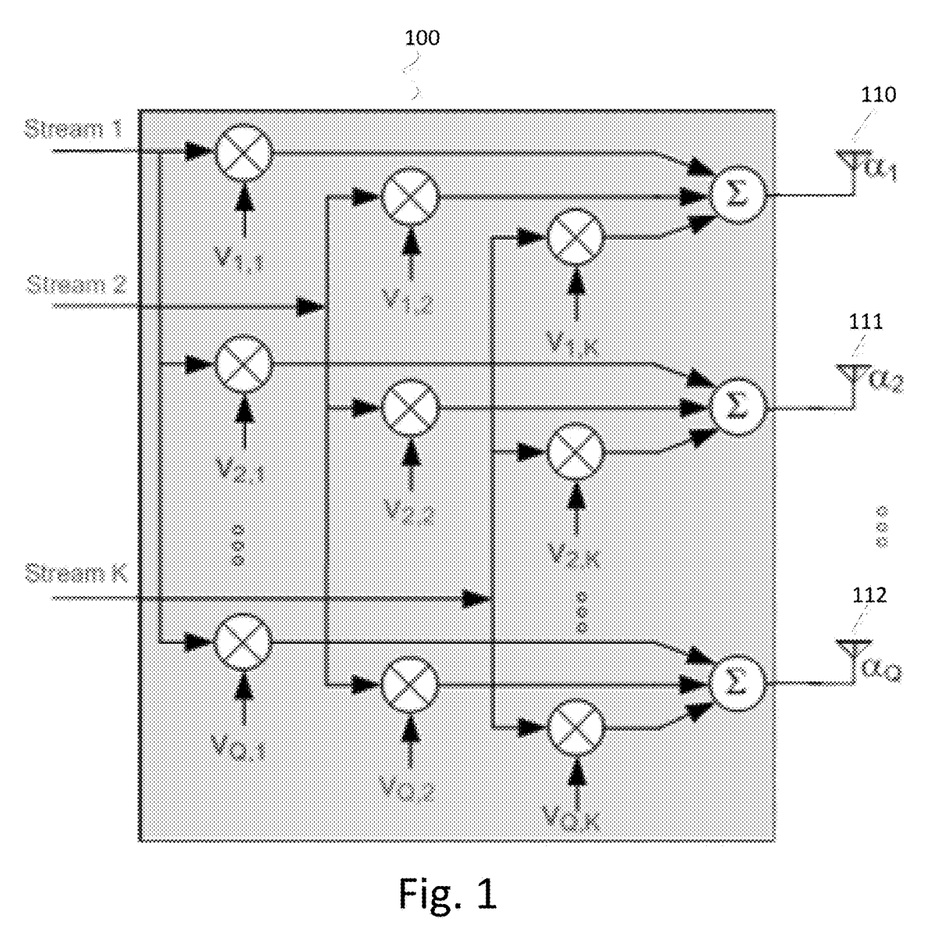
FIG. 1 illustrates an example of a hybrid array as the target array type, according to an embodiment.

In the example of FIG. 1, hybrid array 100 may include Q antenna elements 110, 111, 112 transmitting respective signals $\alpha_1$ through $\alpha_Q$. As illustrated in FIG. 1, the signals on each antenna 110, 111, 112 are weighted sums of K signal streams where $v_{m,n}$ is a complex weight applied to signal stream n on antenna m. The complex weights $v_{m,n}$ are wideband array weights as they are applied across the entire bandwidth spanned by the signal streams. This array 100 is called a hybrid array because each of the K input streams can come from a digital baseband network, hence the array is a mix of both analog (the $v_{m,n}$'s shown in FIG. 1) and digital baseband signals.

As illustrated in the example of FIG. 1, a MU-MIMO user may transmit a single stream and, in this case, K is the number of MU-MIMO users (the number of MU-MIMO users will also be referred to as $N_u$). Alternatively, a MU-MIMO user can have more than one stream. As an example, a user may transmit 2 streams, then in this case the number of MU-MIMO users is $N_u$=K/2. An objective is to find a phase-only (equal-gain) Q×1 transmit weight vector for each user, $v_u$ (where $v_{n,u}$ is the $n^{th}$ element of $v_u$) using either the maximum sum SINR constraint or maximum sum throughput constraint. It is noted that, in the following, $w_u$ may be used in place of $v_u$.

It is also noted that, as described herein, a "user" or "MU-MIMO user" may refer to a user equipment (UE), user device, mobile device, or the like. Therefore, embodiments of the present disclosure may alternately refer to a "user" as a "MU-MIMO user," "user equipment," "UE," or "mobile device," for example.

Figure 2:
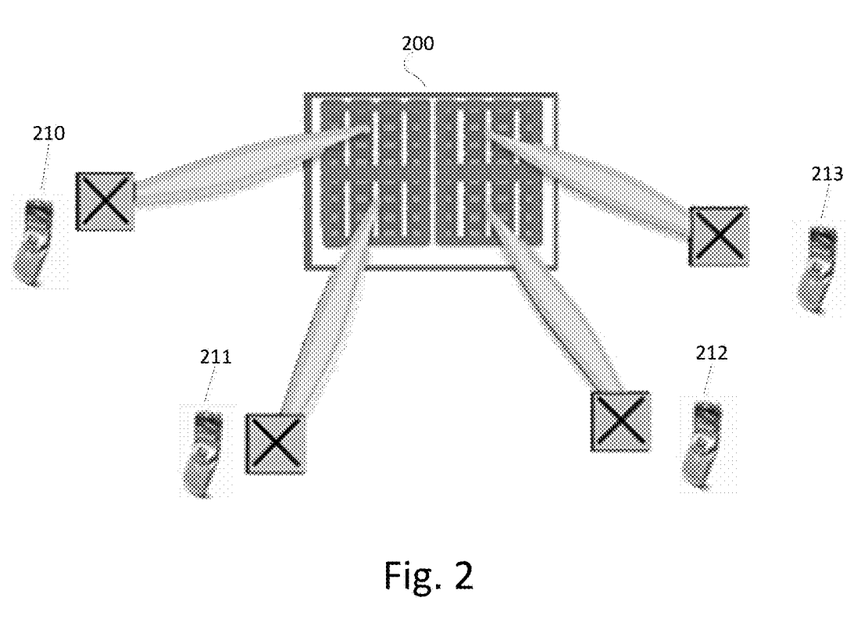
FIG. 2 illustrates an example of an alternate hybrid array where a panel only sends a single data stream, according to another embodiment.

FIG. 2 illustrates an example of an alternate hybrid array 200 where a panel sends a single data stream to each user 210, 211, 212, 213 (e.g., each MU-MIMO user would be transmitted to from its own panel which could be the array of FIG. 1 with K=1 for a single stream from the user or K=2 with dual-streams from the user). It is noted that, while four users are illustrated in the example of FIG. 2, this is just one example and any number of users may be included according to certain embodiments.

One example of an advantage of the structure depicted in FIG. 2 is that it may retain low peak-to-average power ratio (PAPR) waveforms since multiple streams are not summed up on a single antenna like in the full hybrid array of FIG. 1. Also, for example, the structure of FIG. 2 may allow for more efficient channel sounding as pilots can be sent from multiple panels at the same time. To transmit more than one stream to each MU-MIMO user 210, 211, 212, 213, separate panels may be used. For example, if two data streams are desired, the two panels transmitting to a single MU-MIMO user could have orthogonal polarizations. Another option is for a panel to be comprised of cross-polarized elements, but this case is conceptually the same as having a separate panel per polarization as a full baseband transceiver is needed for each polarization.

As mentioned in the foregoing, one embodiment is directed to equal-gain (phase-only) MU-MIMO weights for the full hybrid array (e.g., hybrid array 100 of FIG. 1) where the MU-MIMO weights either maximize the sum SINR or the sum throughput. As will be discussed below, scheduler conditions can be imposed, such as weighting some users higher if their proportional-fair metric is high due to an increased need for data transmission.

It is assumed that the transmitter (e.g., the AP) has transmit covariance matrices and a noise (or SNR) estimates from each user. These may be obtained in a number of ways, for example: the UE can feedback the best beam (e.g., through codebook feedback or with eigenvector feedback), the UE can use covariance feedback, the AP can use a reference signal transmitted on the uplink to determine the covariance matrix, or the UE can use basis function feedback. Then the weights that maximize SINR are found as the solution to the following formula (note that w below is the same as v shown in FIG. 1):

$$\max_{w_1 \ldots w_{N_u}} \sum_{u=1}^{N_u} \frac{w_u^H R_u w_u}{\sigma_u^2 + \sum_{\substack{l=1 \\ l \neq u}}^{N_u} w_l^H R_u w_l} \text{ subject to } |w_{n,u}| =$$

$$\frac{1}{\sqrt{QN_u}} \text{ for } 1 \leq n \leq Q \text{ and } 1 \leq u \leq N_u,$$

where $N_u$ is the total number of users, $w_u$ is the Q×1 transmit weight for user u, $R_u$ is the Q×Q transmit covariance matrix for user u, $\sigma_u^2$ is the noise power at user u, and $w_{n,u}$ is the $n^{th}$ element of $w_u$. It is noted that the equal-gain constraint shown here assumes unit total transmit power across all Q elements. Other equal-gain constraints (e.g., unit power on each antenna element) may also be used.

A closed-form solution may not be possible, but either iterative or gradient searches can be used. For example, the gradient for user p's weight can be shown to be:

$$\nabla_p = \frac{2R_p w_p}{\sigma_p^2 + \sum_{\substack{\ell=1 \\ \ell \neq p}}^{N_u} w_\ell^H R_p w_\ell} - \sum_{\substack{u=1 \\ u \neq p}}^{N_u} \frac{2R_u w_p w_u^H R_u w_u}{\left(\sigma_u^2 + \sum_{\substack{\ell=1 \\ \ell \neq u}}^{N_u} w_\ell^H R_u w_\ell\right)^2}.$$

In an embodiment, for the gradient search outlined in the following, all $\sigma_u^2$ may be set to 1 and the corresponding correlation matrix, $R_u$, may be scaled by $1/\sigma_u^2$. Thus, according to one embodiment, an efficient gradient search may be as follows: (1) start with regularized ZF transmit weights for $w_1$ through $w_{Nu}$; (2) enforce the equal-gain constraint, $$|w_{n,u}| = \frac{1}{\sqrt{QN_u}} \text{ for } 1 \leq n \leq Q \text{ and } 1 \leq u \leq N_u;$$

(3) set iteration i=0, user p=1, and gradient step size α=0.01; (4) compute the gradient for user p using the formula above; (5) update user p's weight as $w_p = w_p + \alpha\nabla_p$; (6) enforce the equal gain constraint:

$$|w_{n,p}| = \frac{1}{\sqrt{QN_u}} \text{ for } 1 \leq n \leq Q;$$

(7) p=p+1, if p=$N_u$+1, set p=1 and go to step 8, otherwise go to step 4; (8) check if the sum SINR (or sum throughput if the throughput criteria is used) improved with the updated weights and, if the weights did not improve the sum SINR (or sum throughput), return to the old weights and decrease the gradient step size (e.g., α=0.9α); (9) i=i+1, if the maximum number of iterations (e.g., 100) are not reached, go to step 4, otherwise go to step 10; and (10) (optional) if the SINR of a user is below a threshold (e.g., −5 dB) then remove that user from the group of users being paired and increase the power of all of the remaining users. The users which are removed because they fail to meet a threshold would have to be scheduled again at a later time.

An alternate embodiment of the gradient search updates the weights of all users being paired for MU-MIMO transmission in a single step. As in the previous gradient search process all $\sigma_u^2$ may be set to 1 and the corresponding correlation matrix, $R_u$, may be scaled by $1/\sigma_u^2$. Thus, according to an alternate embodiment, an efficient gradient search may be as follows: (1) start with regularized ZF transmit weights for $w_1$ through $w_{N_u}$; (2) enforce the equal-gain constraint, $$|w_{n,u}| = \frac{1}{\sqrt{QN_u}} \text{ for } 1 \leq n \leq Q \text{ and } 1 \leq u \leq N_u;$$

(3) set iteration i=0, and gradient step size $\alpha$=0.01; (4) compute the gradient for all users p=1, . . . $N_u$ using the formula above; (5) jointly update all user weights as $w_p = w_p + \alpha \nabla_p$ for p=1, . . . $N_u$; (6) enforce the equal gain constraint:

$$|w_{n,p}| = \frac{1}{\sqrt{QN_u}} \text{ for } 1 \leq n \leq Q;$$

(7) check if the sum SINR (or sum throughput if the throughput criteria is used) improved with the updated weights and, if the weights did not improve the sum SINR (or sum throughput), return to the old weights and decrease the gradient step size (e.g., $\alpha$=0.9$\alpha$); (8) i=i+1, if the maximum number of iterations (e.g., 100) are not reached, go to step 4, otherwise go to step 9; and (9) (optional) if the SINR of a user is below a threshold (e.g., −5 dB) then remove that user from the group of users being paired and increase the power of all of the remaining users. The users which are removed because they fail to meet a threshold would have to be scheduled again at a later time.

Note that in the above gradient searches that a projected gradient search is used to enforce the equal-gain constraint (steps 2 and 6 in both approaches) and a complex-valued gradient is used which includes the amplitude which may be disregarded when the equal-gain constraints are applied. An alternative is to find a gradient of the phases only in the weights. In this case the Q×1 weight for user u is modeled as:

$$w_u = \frac{1}{\sqrt{QN_u}} \begin{bmatrix} e^{j\beta_{1,u}} \\ e^{j\beta_{2,u}} \\ \vdots \\ e^{j\beta_{Q,u}} \end{bmatrix}$$

where $j=\sqrt{-1}$ and $\beta_{1,u}$ through $\beta_{Q,u}$ are the real-valued phase values of user u's weights which will be determined.

In order to determine a gradient with respect to these phases the following may be used:

$$w_u^H R w_u = \frac{1}{QN_u} \left( \sum_{\ell=1}^{Q} r_{\ell,\ell} + 2 \sum_{\ell=1}^{Q-1} \sum_{m=\ell+1}^{Q} (p_{\ell,m} \cos(\beta_{\ell,u} - \beta_{m,u}) + q_{\ell,m} \sin(\beta_{\ell,u} - \beta_{m,u})) \right)$$

where R is a Q×Q covariance matrix like is used in the sum SINR equation above where it is noted that for covariance matrices that $r_{n,m} = r^*_{m,n}$ where $r_{n,m}$ is element (n,m) from R, and $r_{n,m} = p_{n,m} + j q_{n,m}$ where $p_{n,m}$ and $q_{n,m}$ are real numbers (note that for n=m, $q_{n,n}$=0).

Let the function $f(\beta_{1,u}, \ldots, \beta_{Q,u}, R)$ be defined as:

$$f(\beta_{1,u}, \ldots, \beta_{Q,u}, R) = w_u^H R w_u =$$
$$\frac{1}{QN_u} \left( \sum_{\ell=1}^{Q} r_{\ell,\ell} + 2 \sum_{\ell=1}^{Q-1} \sum_{m=\ell+1}^{Q} (p_{\ell,m} \cos(\beta_{\ell,u} - \beta_{m,u}) + q_{\ell,m} \sin(\beta_{\ell,u} - \beta_{m,u})) \right).$$

Then the gradient with respect to $\beta_{m,u}$ can be shown to be:

$$\nabla_{\beta_{m,u}} f(\beta_{1,u}, \ldots, \beta_{Q,u}, R) =$$
$$\frac{1}{QN_u} \sum_{\substack{\ell=1 \\ \ell \neq m}}^{Q} (-p_{m,\ell} \sin(\beta_{m,u} - \beta_{\ell,u}) + q_{m,\ell} \cos(\beta_{m,u} - \beta_{\ell,u}))$$

Returning then to the original max-sum SINR expression:

$$\max_{w_1 \ldots w_{N_u}} \sum_{u=1}^{N_u} \frac{w_u^H R_u w_u}{\sigma_u^2 + \sum_{\substack{\ell=1 \\ \ell \neq u}}^{N_u} w_\ell^H R_u w_\ell} \text{ subject to}$$

$$|w_{n,u}| = \frac{1}{\sqrt{QN_u}} \text{ for } 1 \leq n \leq Q \text{ and } 1 \leq u \leq N_u,$$

the gradient with respect to the phases can be found as:

$$\nabla_{\beta_{\ell,p}} = \frac{\nabla_{\beta_{\ell,p}} f(\beta_{1,p}, \ldots, \beta_{Q,p}, R_p)}{\sigma_u^2 + \sum_{\substack{\ell=1 \\ \ell \neq u}}^{N_u} f(\beta_{1,\ell}, \ldots, \beta_{Q,\ell}, R_p)} -$$
$$\sum_{\substack{u=1 \\ u \neq p}}^{N_u} \frac{f(\beta_{1,u}, \ldots, \beta_{Q,u}, R_u) \nabla_{\beta_{\ell,p}} f(\beta_{1,p}, \ldots, \beta_{Q,p}, R_u)}{\left( \sigma_u^2 + \sum_{\substack{\ell=1 \\ \ell \neq p}}^{N_u} f(\beta_{1,\ell}, \ldots, \beta_{Q,\ell}, R_u) \right)^2}$$

Using the above gradient, a phase-only gradient search can be performed as follows: (1) start with regularized ZF transmit weights for $w_1$ through $w_{N_u}$; (2) enforce the equal-gain constraint, $$|w_{n,u}| = \frac{1}{\sqrt{QN_u}} \text{ for } 1 \leq n \leq Q \text{ and } 1 \leq u \leq N_u$$

and find $\beta_{n,u}$ as the respective phases of $w_{n,u}$; (3) set iteration i=0, and gradient step size $\alpha$=0.01; (4) compute the gradient for all users p=1, . . . , $N_u$ using the formula above; (5) jointly update all user phase values as $\beta_{n,p} = \beta_{n,p} + \alpha \nabla_{\beta_{n,p}}$ for p=1, . . . , $N_u$; and n=1, . . . , Q; (6) check if the sum SINR (or sum throughput if the throughput criteria is used) improved with the updated phase values and, if the phase values did not improve the sum SINR (or sum throughput), return to the old phase value and decrease the gradient step size (e.g., $\alpha$=0.9$\alpha$); (7) i=i+1, if the maximum number of iterations (e.g., 100) are not reached, go to step 4, otherwise go to step 8; and (8) (optional) if the SINR of a user is below a threshold (e.g., −5 dB) then remove that user from the group of users being paired and increase the power of all of the remaining users. The users which are removed because they fail to meet a threshold would have to be scheduled again at a later time.

In an alternate embodiment of the phase-only gradient search, one of the phase values for each user (e.g., $\beta_{l,u}$) can be set to zero since the received signal at the UE can be rotated by an arbitrary phase. Doing this may decrease the computational complexity since one less weight needs to be determined. Note also that the phase-only search can be augmented so that quantization of the phase values can be enforced (e.g., by quantizing the phase in step 5 to a small number of bits like 3).

According to an embodiment, the max-throughput weights may be found as the solution to the following formula:

$$\max_{w_1 \ldots w_{N_u}} \sum_{u=1}^{N_u} \ln(1 + SINR_u) \text{ subject to}$$

$$|w_{n,u}| = \frac{1}{\sqrt{QN_u}} \text{ for } 1 \leq n \leq Q \text{ and } 1 \leq u \leq N_u.$$

This optimization problem can be easily expanded to include scheduler constraints. For example, a scheduler may give a weighting, $\gamma_u$, to each user's historical throughput/fairness. In this way, the scheduler can influence the weight design by emphasizing certain users over others if it deems those users have a higher priority to be scheduled. To include this weighting, the optimization problem becomes the following:

$$\max_{w_1 \ldots w_{N_u}} \sum_{u=1}^{N_u} \gamma_u \ln(1 + SINR_u) \text{ subject to}$$

$$|w_{n,u}| = \frac{1}{\sqrt{QN_u}} \text{ for } 1 \leq n \leq Q \text{ and } 1 \leq u \leq N_u,$$

which can be expressed as:

$$\max_{w_1 \ldots w_{N_u}} \sum_{u=1}^{N_u} \gamma_u \ln\left(1 + \frac{w_u^H R_u w_u}{\sigma_u^2 + \sum_{\substack{\ell=1 \\ \ell \neq u}}^{N_u} w_\ell^H R_u w_\ell}\right) \text{ subject to}$$

$$|w_{n,u}| = \frac{1}{\sqrt{QN_u}} \text{ for } 1 \leq n \leq Q \text{ and } 1 \leq u \leq N_u$$

The gradient for user p can be shown to be:

$$\nabla_p = \frac{2\gamma_p R_p w_p}{x_p(1 + s_p)} - \sum_{\substack{u=1 \\ u \neq p}}^{N_u} \frac{2\gamma_u w_u^H R_u w_u R_u w_p}{x_u^2(1 + s_u)},$$

where $x_u$ (the interference plus noise power for user u) and $s_u$ (the SINR of user u) are given as:

$$x_u = \sigma_u^2 + \sum_{\substack{\ell=1 \\ \ell \neq u}}^{N_u} w_\ell^H R_u w_\ell \text{ and } s_u = \frac{w_u^H R_u w_u}{x_u}.$$

According to certain embodiments, the same gradient search used for the maximum SINR criteria (either embodiment given above) can be used with the maximum throughput criteria.

Note that the maximum throughput design can also be accomplished using a phase-only approach similar to the maximum sum SINR search above.

For either transmit weights, users can have more than one stream. One way to handle multiple streams is to treat each individual stream as a different user and then run the algorithm as is. Another way is for each user to have two streams where polarization is used to separate the streams. For example, if there are two patch arrays with orthogonal polarizations with Q antennas per patch (or a single patch array of Q cross-polarized antennas for a total of 2Q antennas), then the algorithm can be run separately on each patch (or each polarization in the cross-polarized example). Another approach would be block diagonalization where the interference part only includes other users and their streams, not the stream to the user whose weights are being calculated.

It is noted that if the covariance matrix is approximated as the sum of a few dominant eigenmodes, then the computations of the gradients can be greatly reduced since the computation of $w_u^H R_p w_k$ can be simplified. Also, other criteria than equal-gain on each MU-MIMO weight could be applied and still meet the goal of transmitting the maximal power on each of the Q antennas. For example, the sum of the powers of all the weights on a single antenna could sum to one:

$$\sum_{p=1}^{N_u} |w_{n,p}|^2 = 1 \text{ for } 1 \leq n \leq Q.$$

To enforce this constraint, step 2 and 6 of the above gradient searches can be modified accordingly. It should be noted that the constraints given in steps 2 and 6 are a subset of this constraint.

According to certain embodiments, the gradient search can be quite powerful since, at each iteration, different optimization criteria may be applied. For example, if some user does not meet a minimum SINR or throughput constraint, then the gradient can be switched to one that maximizes that user's SINR or throughput. Consider the throughput optimization which may be:

$$\max_{w_1 \ldots w_{N_u}} \sum_{u=1}^{N_u} \ln(1 + s_u)$$

subject to some constraint on the transmit weights.

If, at some point in the gradient iterations that maximizes either sum throughput or sum SINR, one or more users' minimum throughput is not met, then the maximization can be modified to:

$$\max_{w_1 \ldots w_{N_u}} \sum_{u \in \Omega}^{N_u} \ln(1 + s_u)$$

where $\Omega$ is the set of users whose minimum throughput is not met. The gradient can be shown to be:

$$\nabla_p = \frac{2R_p w_p}{x_p(1+s_p)} - \sum_{\substack{u \in \Omega \\ u \neq p}} \frac{2w_u^H R_u w_u R_u w_p}{x_u^2(1+s_u)} \text{ if } p \in \Omega;$$

$$\text{or } \nabla_p = -\sum_{u \in \Omega} \frac{2w_u^H R_u w_u R_u w_p}{x_u^2(1+s_u)} \text{ if } p \notin \Omega.$$

Hence, an alternative gradient search that guarantees a minimum SINR or throughput may be as follows: (1) have minimum SINR targets for each user ($SINR_u$) where a throughput constraint can be mapped to an SINR value; (2) start with regularized ZF transmit weights for $w_1$ through $w_{N_u}$; (3) enforce the equal-gain constraint:

$$|w_{n,u}| = \frac{1}{\sqrt{QN_u}} \text{ for } 1 \le n \le Q \text{ and } 1 \le u \le N_u;$$

(4) set iteration i=0, user p=1, and gradient step size α=0.01; (5) compute $s_u$ (SINR) and $x_u$ (interference plus noise power) for each user; (6) determine which set of users, u∈Ω, does not meet their SINR constraint, $SINR_u$; (7) if Ω is empty, then compute the gradient for weight p using one of the formula above that either maximizes sum throughput or sum SINR, otherwise compute the gradient for weight p that maximizes the throughput or SINR of the users in Ω; (8) update user p's weight as $w_p = w_p + \alpha \nabla_p$; (9) enforce the equal gain constraint:

$$|w_{n,p}| = \frac{1}{\sqrt{QN_u}} \text{ for } 1 \le n \le Q;$$

(10) p=p+1. If p=Nu+1, set p=1 and go to step 11, otherwise go to step 7; (11) if Ω is empty, check if the sum SINR (or sum throughput if the throughput criteria is used) improved with the updated weights and if the weights did not improve the sum SINR (or sum throughput), return to the old weights and decrease the gradient step size (e.g., α=0.9α). If Ω is non-empty, do not perform this check since there is no guarantee the sum throughput will improve when enforcing a minimum throughput or SINR constraint on a set of users; (12) i=i+1. If the maximum number of iterations (e.g., 100) is not reached, go to step 5, otherwise go to step 13; and (13) optionally, if the SINR of a user is below a threshold (e.g., −5 dB) then remove that user from the group of users being paired and increase the power of all of the remaining users. The users which are removed because they fail to meet a threshold (i.e., likely would have zero throughput) would have to be scheduled again at a later time.

It is noted that the above gradient search can be modified so that all user's weights are updated in a single step. In addition the above gradient search can be modified so that only the phase values of the weights are determined.

It is also noted that the above search may be combined with a scheduler that can provide minimum throughput or SINR targets for each user. In an embodiment, the throughput or SINR targets may be based on some scheduler criteria like proportional fair. As described above, a per-user weighting provided by the scheduler may be used.

In another embodiment, the gradient approach can be used when the per-panel MU-MIMO (e.g., see FIG. 2) weights are employed. In this embodiment, there are $N_u$ panels (one for each MU-MIMO user) where each panel has Q antennas. In this case, the maximum sum throughput optimization becomes:

$$\max_{w_1 \ldots w_{N_u}} \sum_{u=1}^{N_u} \ln(1+s_u) \text{ subject to}$$

$$|w_{n,u}| = \frac{1}{\sqrt{Q}} \text{ for } 1 \le n \le Q \text{ and } 1 \le u \le N_u,$$

where $x_u$ (the interference plus noise power for user u) and $s_u$ (the SINR of user u) are given as:

$$x_u = \sigma_u^2 + \sum_{\substack{\ell=1 \\ \ell \neq u}}^{N_u} w_\ell^H R_{\ell,u} w_\ell \text{ and } s_u = \frac{w_u^H R_{u,u} w_u}{x_u},$$

and where $R_{p,u}$ is the Q×Q covariance matrix from panel p to user u. The gradient, which can be used in any of the gradient search procedures outlined above, can be shown as:

$$\nabla_p = \frac{2R_{p,p} w_p}{x_p(1+s_p)} - \sum_{\substack{u=1 \\ u \neq p}}^{N_u} \frac{2w_u^H R_{u,u} w_u R_{p,u} w_p}{x_u^2(1+s_u)}.$$

Similar to the other gradient searches above, a gradient of only the phase values can be calculated and the phase values are determined through the gradient search procedure.

Figure 3:
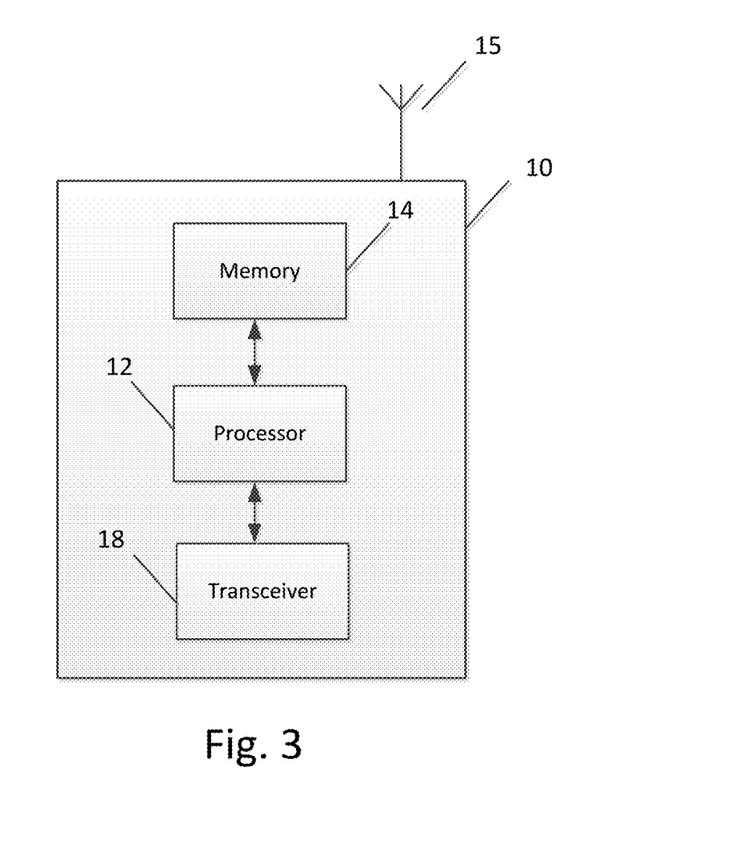
FIG. 3 illustrates an example block diagram of an apparatus, according to one embodiment.

FIG. 3 illustrates an example of an apparatus 10 according to an embodiment. In an embodiment, apparatus 10 may be a node, host, or server in a communications network or serving such a network. For example, in certain embodiments, apparatus 10 may be an access node, base station, a node B, an evolved node B (eNB), 5G node B or access point, next generation node B (gNB), or WLAN access point. It should be noted that one of ordinary skill in the art would understand that apparatus 10 may include components or features not shown in FIG. 3.

As illustrated in FIG. 3, apparatus 10 may include a processor 12 for processing information and executing instructions or operations. Processor 12 may be any type of general or specific purpose processor. While a single processor 12 is shown in FIG. 3, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station, node B, eNB, or a 5G or next generation node B. According to certain embodiments, apparatus 10 may be controlled by memory 14 and processor 12 to perform the functions associated with embodiments described herein. In one embodiment, apparatus 10 may be controlled by memory 14 and processor 12 to select users to pair for MU-MIMO transmission, and to calculate MU-MIMO transmit weights, for example, in a communication system employing an analog electrically steered array with Q antennas. According to one embodiment, apparatus 10 may be controlled by memory 14 and processor 12 to calculate the MU-MIMO transmit weights so that a sum of power across a same element of the selected paired user's weight vectors is equal on all of the Q antennas and one of either sum throughput across users or sum signal to interference plus noise ratio (SINR) across users is maximized. In an embodiment, apparatus 10 may be further controlled by memory 14 and processor 12 to apply the MU-MIMO transmit weights to transmitted signals, and to transmit the weighted signals from an antenna array.

According to an embodiment, apparatus 10 may be controlled by memory 14 and processor 12 to not transmit to users with SINR or throughput that is below a certain threshold and to provide their power to other users. In one embodiment, apparatus 10 may be controlled by memory 14 and processor 12 to guarantee each user a minimum SINR or a minimum throughput.

In certain embodiments, apparatus 10 may be controlled by memory 14 and processor 12 to calculate the MU-MIMO transmit weights with a gradient search. The gradient search may be performed according to any of the gradient searches outlined above. For example, in an embodiment, the gradient search may employ either a joint gradient calculated across the selected users at once or a coordinate descent gradient approach where the gradient is updated on a user by user basis. In another embodiment, the gradient search may employ either a gradient calculated from phase values of the weights directly or from applying a constraint of equal amplitude to the unconstrained gradient.

In some embodiments, where the transmit weights are calculated to maximize the SINR, the transmit weights that maximize the SINR may be found as a solution to the following formula:

$$\max_{w_1 \ldots w_{N_u}} \sum_{u=1}^{N_u} \frac{w_u^H R_u w_u}{\sigma_u^2 + \sum_{\substack{\ell=1 \\ \ell \neq u}}^{N_u} w_\ell^H R_u w_\ell} \text{ subject to}$$

$$|w_{n,u}| = \frac{1}{\sqrt{QN_u}} \text{ for } 1 \leq n \leq Q \text{ and } 1 \leq u \leq N_u.$$

where $N_u$ is a total number of selected users, $w_u$ is the Q×1 transmit weight for user u, $R_u$ is the Q×Q transmit covariance matrix for user u, $\sigma_u^2$ is the noise power at user u, and $w_{n,u}$ is the $n^{th}$ element of $w_u$.

According to certain embodiments, where the transmit weights are calculated to maximize throughput, the transmit weights that maximize the throughput may be found as a solution to the following formula:

$$\max_{w_1 \ldots w_{N_u}} \sum_{u=1}^{N_u} \ln(1 + SINR_u) \text{ subject to}$$

$$|w_{n,u}| = \frac{1}{\sqrt{QN_u}} \text{ for } 1 \leq n \leq Q \text{ and } 1 \leq u \leq N_u,$$

where $N_u$ is a total number of selected users, $w_u$ is the Q×1 transmit weight for user u, and $w_{n,u}$ is the $n^{th}$ element of $w_u$.

In certain embodiments, the gradient search may include calculating a gradient for the transmit weights for a user p according to the following:

$$\nabla_p = \frac{2R_p w_p}{\sigma_p^2 + \sum_{\substack{\ell=1 \\ \ell \neq p}}^{N_u} w_\ell^H R_p w_\ell} - \sum_{\substack{u=1 \\ u \neq p}}^{N_u} \frac{2R_u w_p w_u^H R_u w_u}{\left(\sigma_u^2 + \sum_{\substack{\ell=1 \\ \ell \neq u}}^{N_u} w_\ell^H R_u w_\ell\right)^2},$$

where $N_u$ is a total number of selected users, $w_u$ is the $Q \times 1$ transmit weight for user u, $R_u$ is the $Q \times Q$ transmit covariance matrix for user u, and $\sigma_u^2$ is the noise power at user u.

According to some embodiments, the gradient search may include a per-user weighting provided by a scheduler. For example a scheduler may give a weighting, $\gamma_u$, to each user's historical throughput/fairness. In this manner, the scheduler can influence the weight design by emphasizing certain users over others if it deems those users to have a higher priority to be scheduled. In an embodiment, to include this weighting, the weight optimization formula may be:

$$\max_{w_1 \ldots w_{N_u}} \sum_{u=1}^{N_u} \gamma_u \ln(1 + SINR_u) \text{ subject to}$$

$$|w_{n,u}| = \frac{1}{\sqrt{QN_u}} \text{ for } 1 \leq n \leq Q \text{ and } 1 \leq u \leq N_u,$$

which can be expressed as:

$$\max_{w_1 \ldots w_{N_u}} \sum_{u=1}^{N_u} \gamma_u \ln\left(1 + \frac{w_u^H R_u w_u}{\sigma_u^2 + \sum_{\substack{\ell=1 \\ \ell \neq u}}^{N_u} w_\ell^H R_u w_\ell}\right) \text{ subject to}$$

$$|w_{n,u}| = \frac{1}{\sqrt{QN_u}} \text{ for } 1 \leq n \leq Q \text{ and } 1 \leq u \leq N_u$$

The gradient for user p can be shown to be:

$$\nabla_p = \frac{2\gamma_p R_p w_p}{x_p(1+s_p)} - \sum_{\substack{u=1 \\ u \neq p}}^{N_u} \frac{2\gamma_u w_u^H R_u w_u R_u w_p}{x_u^2(1+s_u)}$$

where $x_u$ (the interference plus noise power for user u) and $s_u$ (the SINR of user u) are given as:

$$x_u = \sigma_u^2 + \sum_{\substack{\ell=1 \\ \ell \neq u}}^{N_u} w_\ell^H R_u w_\ell \text{ and } s_u = \frac{w_u^H R_u w_u}{x_u}.$$

It is noted that, in certain embodiments, the same gradient search used for the maximum SINR criteria may be used with the maximum throughput criteria.

In an embodiment, covariance matrices of each user used to calculate the gradient may be scaled by one over a noise power estimate for a respective user. According to certain embodiments, apparatus 10 may be controlled by memory 14 and processor 12 to transmit one or more streams to each user, where the transmit weights are optimized across the users and the streams.

Figure 4:
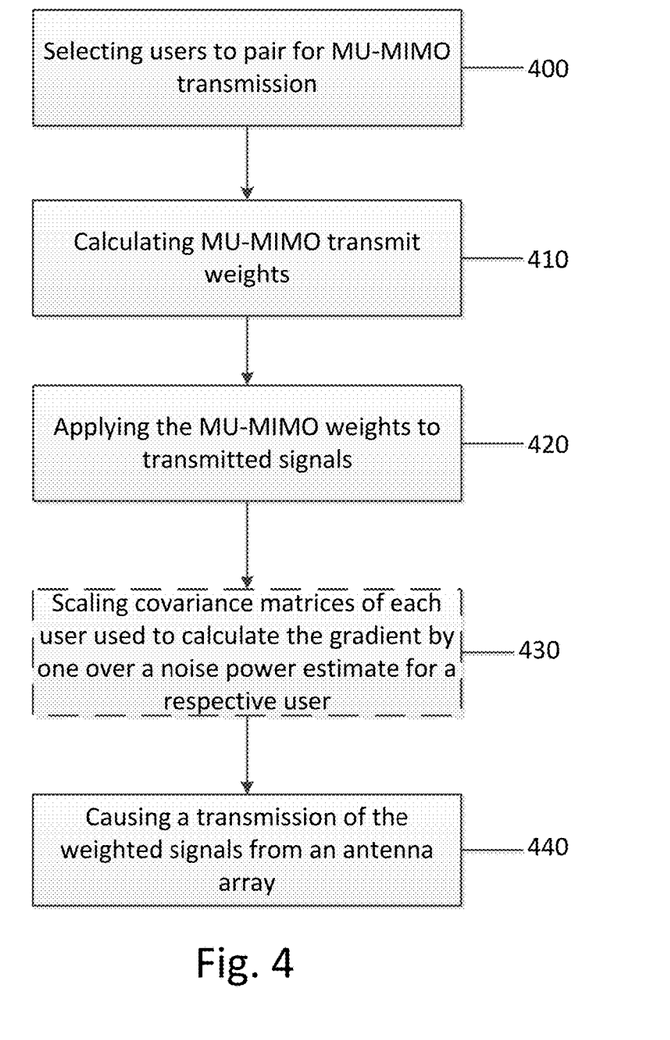
FIG. 4 illustrates an example of a flow diagram of a method, according to an embodiment.

FIG. 4 illustrates an example flow chart of a method, according to one embodiment. In certain embodiments, the method may be performed by a network node or access node, such as a base station, node B, eNB, or a 5G or next generation node B. In one embodiment, the method may include, at 400, selecting users to pair for MU-MIMO transmission. The method may then include, at 410, calculating MU-MIMO transmit weights, for example, in a communication system employing an analog electrically steered array with Q antennas. According to one embodiment, the calculating step 410 may include calculating the MU-MIMO transmit weights so that a sum of power across a same element of the selected paired users' weight vectors is equal on all of the Q antennas and one of either sum throughput across users or sum signal to interference plus noise ratio (SINR) across users is maximized.

In an embodiment, the method of FIG. 4 may further include, at 420, applying the MU-MIMO transmit weights to transmitted signals. The method may then include, at 440, causing the transmission of the weighted signals from an antenna array.

According to an embodiment, the method may include not transmitting to users with SINR or throughput that is below a certain threshold and providing their power to other users. For example, in an embodiment, the method may include determining whether a user's SINR or throughput that is below a certain pre-defined threshold and, if so, not transmitting to that user and allocating its power to other users. In one embodiment, the method may include guaranteeing each user a minimum SINR or a minimum throughput.

In certain embodiments, the calculating step may include calculating the MU-MIMO transmit weights with a gradient search. The gradient search may be performed according to any of the gradient searches outlined above. For example, in an embodiment, the gradient search may employ either a joint gradient calculated across the selected users at once or a coordinate descent gradient approach where the gradient is updated on a user by user basis. In another embodiment, the gradient search may employ either a gradient calculated from phase values of the weights directly or from applying a constraint of equal amplitude to the unconstrained gradient.

In some embodiments, when the transmit weights are calculated to maximize the SINR, the transmit weights that maximize the SINR may be found as a solution to the following formula:

$$\max_{w_1 \ldots w_{N_u}} \sum_{u=1}^{N_u} \frac{w_u^H R_u w_u}{\sigma_u^2 + \sum_{\substack{\ell=1 \\ \ell \neq u}}^{N_u} w_\ell^H R_u w_\ell} \text{ subject to}$$

$$|w_{n,u}| = \frac{1}{\sqrt{QN_u}} \text{ for } 1 \leq n \leq Q \text{ and } 1 \leq u \leq N_u.$$

where $N_u$ is a total number of users, $w_u$ is the $Q \times 1$ transmit weight for user u, $R_u$ is the $Q \times Q$ transmit covariance matrix for user u, $\sigma_u^2$ is the noise power at user u, and $w_{n,u}$ is the $n^{th}$ element of $w_u$.

According to certain embodiments, when the transmit weights are calculated to maximize throughput, the transmit weights that maximize the throughput may be found as a solution to the following formula:

$$\max_{w_1 \ldots w_{N_u}} \sum_{u=1}^{N_u} \ln(1 + SINR_u) \text{ subject to}$$

$$|w_{n,u}| = \frac{1}{\sqrt{QN_u}} \text{ for } 1 \leq n \leq Q \text{ and } 1 \leq u \leq N_u,$$

where $N_u$ is a total number of users, $w_u$ is the Q×1 transmit weight for user u, and $w_{n,u}$ is the $n^{th}$ element of $w_u$.

In certain embodiments, the gradient search may include calculating a gradient for the transmit weights for a user p according to the following:

$$\nabla_p = \frac{2R_p w_p}{\sigma_p^2 + \sum_{\ell=1, \ell \neq p}^{N_u} w_\ell^H R_p w_\ell} - \sum_{\substack{u=1 \\ u \neq p}}^{N_u} \frac{2R_u w_p w_u^H R_u w_u}{\left(\sigma_u^2 + \sum_{\ell=1, \ell \neq u}^{N_u} w_\ell^H R_u w_\ell\right)^2},$$

where $N_u$ is a total number of users, $w_u$ is the Q×1 transmit weight for user u, $R_u$ is the Q×Q transmit covariance matrix for user u, and $\sigma_u^2$ is the noise power at user u.

According to some embodiments, the gradient search may include a per-user weighting provided by a scheduler. For example, a scheduler may provide a weighting, $\Delta_u$, to each user's historical throughput/fairness. As a result, the scheduler can influence the weight design by emphasizing certain users over others if it deems those users to have a higher priority to be scheduled. In an embodiment, to include this weighting, the weight optimization formula may be:

$$\max_{w_1 \ldots w_{N_u}} \sum_{u=1}^{N_u} \gamma_u \ln(1 + SINR_u) \text{ subject to}$$

$$|w_{n,u}| = \frac{1}{\sqrt{QN_u}} \text{ for } 1 \leq n \leq Q \text{ and } 1 \leq u \leq N_u,$$

which can be expressed as:

$$\max_{w_1 \ldots w_{N_u}} \sum_{u=1}^{N_u} \gamma_u \ln\left(1 + \frac{w_u^H R_u w_u}{\sigma_u^2 + \sum_{\ell=1, \ell \neq u}^{N_u} w_\ell^H R_u w_\ell}\right) \text{ subject to}$$

$$|w_{n,u}| = \frac{1}{\sqrt{QN_u}} \text{ for } 1 \leq n \leq Q \text{ and } 1 \leq u \leq N_u$$

The gradient for user p can be shown to be:

$$\nabla_p = \frac{2\gamma_p R_p w_p}{x_p(1 + s_p)} - \sum_{\substack{u=1 \\ u \neq p}}^{N_u} \frac{2\gamma_u w_u^H R_u w_u R_u w_p}{x_u^2(1 + s_u)}$$

where $x_u$ (the interference plus noise power for user u) and $s_u$ (the SINR of user u) are given as:

$$x_u = \sigma_u^2 + \sum_{\substack{\ell=1 \\ \ell \neq u}}^{N_u} w_\ell^H R_u w_\ell \text{ and } s_u = \frac{w_u^H R_u w_u}{x_u}.$$

The same gradient search used for the maximum SINR criteria may be used with the maximum throughput criteria.

In an embodiment, the method may optionally include, at 430, scaling covariance matrices of each user used to calculate the gradient by one over a noise power estimate for a respective user. According to certain embodiments, the method may also optionally include causing the transmission of one or more streams to each user, where the transmit weights are optimized across the users and the streams.

Embodiments described herein are capable of providing several technical improvements and/or advantages. For example, certain embodiments are able to deliver maximal power to an AESA (RF) array while maximizing the sum throughput of the MU-MIMO links. Some embodiments may be used for 5G operations where AESAs are employed (likely 28 GHz and above). Accordingly, the use of embodiments of the invention results in the improved functioning and performance of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In some embodiments, an apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    selecting users to pair for multi-user multiple input multiple output transmission;
    calculating multi-user multiple input multiple output transmit weights in a communication system employing an analog electrically steered array with Q antennas, wherein the multi-user multiple input multiple output transmit weights are applied to transmitted signals;
    applying the multi-user multiple input multiple output transmit weights to the transmitted signals; and
    causing a transmission of the weighted signals from an antenna array,
    wherein the calculating comprises calculating the multi-user multiple input multiple output transmit weights so that a sum of power across a same element of weight vectors of the selected users is equal on all of the Q antennas and one of either sum throughput across users or sum signal to interference plus noise ratio (SINR) across users is maximized,
    wherein the selected users with signal to interference plus noise ratio or throughput that is below a certain threshold are not transmitted to and their power is provided to other users.

2. The method according to claim 1, wherein the calculating comprises calculating the multi-user multiple input multiple output transmit weights with a gradient search.

3. The method according to claim 2, wherein the gradient search employs one of either a joint gradient calculated across the selected users at once or a coordinate descent gradient approach where a gradient is updated on a user by user basis.

4. The method according to claim 2, wherein the gradient search employs one of either a gradient calculated from phase values of the transmit weights directly or from applying a constraint of equal amplitude to an unconstrained gradient.

5. The method according to claim 2, wherein the gradient search comprises calculating a gradient for the multi-user multiple input multiple output transmit weights for a user p according to the following:

$$\nabla_p = \frac{2R_p w_p}{\sigma_p^2 + \sum_{\substack{\ell=1 \\ \ell \neq p}}^{N_u} w_\ell^H R_p w_\ell} - \sum_{\substack{u=1 \\ u \neq p}}^{N_u} \frac{2R_u w_p w_u^H R_u w_u}{\left(\sigma_u^2 + \sum_{\substack{\ell=1 \\ \ell \neq u}}^{N_u} w_\ell^H R_u w_\ell\right)^2},$$

where $N_u$ is a total number of the selected users, $w_u$ is the $Q \times 21$ transmit weight for user u, $R_u$ is the $Q \times Q$ transmit covariance matrix for user u, and $\sigma_u^2$ is the noise power at user u.

6. The method according to claim 2, wherein the gradient search comprises a per-user weighting provided by a scheduler.

7. The method according to claim 2, wherein covariance matrices of each user used to calculate a gradient are scaled by one over a noise power estimate for a respective user.

8. The method according to claim 1, wherein the multi-user multiple input multiple output transmit weights that maximize the signal to interference plus noise ratio are found as a solution to the following formula:

$$\max_{w_1 \ldots w_{N_u}} \sum_{u=1}^{N_u} \frac{w_u^H R_u w_u}{\sigma_u^2 + \sum_{\substack{\ell=1 \\ \ell \neq u}}^{N_u} w_\ell^H R_u w_\ell} \text{ subject to}$$

$$|w_{n,u}| = \frac{1}{\sqrt{QN_u}} \text{ for } 1 \leq n \leq Q \text{ and } 1 \leq u \leq N_u,$$

where $N_u$ is a total number of the selected users, $w_u$ is the $Q \times 1$ transmit weight for user u, $R_u$ is the $Q \times Q$ transmit covariance matrix for user u, $\sigma_u^2$ is the noise power at user u, and $w_{n,u}$ is the $n^{th}$ element of $w_u$.

9. The method according to claim 1, wherein the multi-user multiple input multiple output transmit weights that maximize the throughput are found as a solution to the following formula:

$$\max_{w_1 \ldots w_{N_u}} \sum_{u=1}^{N_u} \ln(1 + SINR_u) \text{ subject to}$$

$$|w_{n,u}| = \frac{1}{\sqrt{QN_u}} \text{ for } 1 \leq n \leq Q \text{ and } 1 \leq u \leq N_u,$$

where $N_u$ is a total number of the selected users, $w_u$ is the $Q \times 1$ transmit weight for user u, and $w_{n,u}$ is the $n^{th}$ element of $w_u$.

10. The method according to claim 1, wherein each of the selected users is guaranteed one of either a minimum signal to interference plus noise ratio or a minimum throughput.

11. The method according to claim 1, further comprising causing a transmission of one or more streams to each user, and wherein the multi-user multiple input multiple output transmit weights are optimized across the selected users and the one or more streams.

12. An apparatus, comprising:
    at least one processor; and
    at least one memory including computer program code,
    the at least one memory and the computer program code configured, with the at least one processor, to cause the apparatus at least to select users to pair for multi-user multiple input multiple output transmission;
calculate multi-user multiple input multiple output transmit weights in a communication system employing an analog electrically steered array with Q antennas, wherein the multi-user multiple input multiple output transmit weights are applied to transmitted signals;
apply the multi-user multiple input multiple output transmit weights to the transmitted signals; and
transmit the weighted signals from an antenna array,
wherein the apparatus is configured to calculate the multi-user multiple input multiple output transmit weights so that a sum of power across a same element of weight vectors of the selected users is equal on all of the Q antennas and one of either sum throughput across users or sum signal to interference plus noise ratio across users is maximized,
wherein the selected users with signal to interference plus noise ratio or throughput that is below a certain threshold are not transmitted to and their power is provided to other users.

13. The apparatus according to claim 12, wherein the at least one memory and the computer program code are further configured, with the at least one processor, to cause the apparatus at least to calculate the multi-user multiple input multiple output transmit weights with a gradient search.

14. The apparatus according to claim 13, wherein the gradient search employs one of either a joint gradient calculated across the selected users at once or a coordinate descent gradient approach where a gradient is updated on a user by user basis.

15. The apparatus according to claim 13, wherein the gradient search employs one of either a gradient calculated from phase values of the transmit weights directly or from applying a constraint of equal amplitude to an unconstrained gradient.

16. The apparatus according to claim 13, wherein the gradient search comprises a per-user weighting provided by a scheduler.

17. The apparatus according to claim 12, wherein the at least one memory and the computer program code are further configured, with the at least one processor, to cause the apparatus at least to find the multi-user multiple input multiple output transmit weights that maximize the signal to interference plus noise ratio as a solution to the following formula:

$$\max_{w_1 \ldots w_{N_u}} \sum_{u=1}^{N_u} \frac{w_u^H R_u w_u}{\sigma_u^2 + \sum_{\substack{\ell=1 \\ \ell \neq u}}^{N_u} w_\ell^H R_u w_\ell} \text{ subject to}$$

$$|w_{n,u}| = \frac{1}{\sqrt{QN_u}} \text{ for } 1 \leq n \leq Q \text{ and } 1 \leq u \leq N_u,$$

where $N_u$ is a total number of the selected users, $w_u$ is the $Q \times 1$ transmit weight for user u, $R_u$ is the $Q \times Q$ transmit covariance matrix for user u, and $\sigma_u^2$ is the noise power at user u, and $w_{n,u}$ is the $n^{th}$ element of $w_u$.

18. The apparatus according to claim 12, wherein the at least one memory and the computer program code are further configured, with the at least one processor, to cause the apparatus at least to find the multi-user multiple input multiple output transmit weights that maximize the throughput as a solution to the following formula:

$$\max_{w_1 \ldots w_{N_u}} \sum_{u=1}^{N_u} \ln(1 + SINR_u) \text{ subject to}$$

$$|w_{n,u}| = \frac{1}{\sqrt{QN_u}} \text{ for } 1 \leq n \leq Q \text{ and } 1 \leq u \leq N_u,$$

where $N_u$ is a total number of the selected users, $w_u$ is the $Q \times 1$ transmit weight for user u, and $w_{n,u}$ is the $n^{th}$ element of $w_u$.

19. The apparatus according to claim 12, wherein the at least one memory and the computer program code are further configured, with the at least one processor, to cause the apparatus at least to transmit one or more streams to each user, and wherein the multi-user multiple input multiple output transmit weights are optimized across the selected users and the one or more streams.

* * * * *